US012674677B2

(12) United States Patent     (10) Patent No.: US 12,674,677 B2

Hermann     (45) Date of Patent: Jul. 7, 2026

(54) ENHANCED NAVIGATION PROMPT SYSTEMS AND METHODS

(71) Applicant: Ford Global Technologies, LLC, Dearborn, MI (US)

(72) Inventor: Thomas Joseph Hermann, Troy, MI (US)

( * ) Notice: Subject to any disclaimer, the term of this patent is extended or adjusted under 35 U.S.C. 154(b) by 36 days.

(21) Appl. No.: 18/361,979

(22) Filed: Jul. 31, 2023

(65) Prior Publication Data

US 2025/0044113 A1    Feb. 6, 2025

(51) Int. Cl.
| | |
|---|---|
| *G01C 21/36* | (2006.01) |
| *G01C 21/34* | (2006.01) |
| *G06Q 10/20* | (2023.01) |

(52) U.S. Cl.
CPC ....... *G01C 21/367* (2013.01); *G01C 21/3476* (2013.01); *G01C 21/3602* (2013.01); *G01C 21/3647* (2013.01); *G06Q 10/20* (2013.01)

(58) Field of Classification Search
None
See application file for complete search history.

(56) References Cited

U.S. PATENT DOCUMENTS

| | | | |
|---|---|---|---|
| 8,452,524 | B2 | 5/2013 | Groitzsch et al. |
| 8,676,500 | B1 | 3/2014 | Walsh |
| 10,223,600 | B2 | 3/2019 | Fischer et al. |
| 11,142,192 | B2 | 10/2021 | Hayamizu et al. |
| 2011/0153166 | A1* | 6/2011 | Yester .................... B60K 35/21 |
| | | | 701/45 |

| | | | |
|---|---|---|---|
| 2014/0067259 | A1* | 3/2014 | Walsh .................... G06Q 50/26 |
| | | | 701/437 |
| 2015/0345981 | A1* | 12/2015 | Goldman-Shenhar ....................... |
| | | | G10L 25/48 |
| | | | 701/533 |
| 2016/0178389 | A1* | 6/2016 | Hainzlmaier ...... G01C 21/3644 |
| | | | 701/467 |
| 2021/0201666 | A1* | 7/2021 | Pelleg ................ G01C 21/3815 |
| 2021/0341306 | A1* | 11/2021 | He ..................... G01C 21/3697 |

(Continued)

FOREIGN PATENT DOCUMENTS

| | | | |
|---|---|---|---|
| JP | 2006038558 A | | 2/2006 |
| JP | 2023058943 A | * | 4/2023 |

OTHER PUBLICATIONS

Machine translation of JP-2023058943-A (Year: 2023).*

(Continued)

*Primary Examiner* — Anne Marie Antonucci
*Assistant Examiner* — Kyle S Park
(74) *Attorney, Agent, or Firm* — Frank Lollo; Eversheds Sutherland (US) LLP

(57) ABSTRACT

A navigation system is disclosed. The system may include a transceiver and a processor. The transceiver may be configured to receive navigation information from a navigation server and sensor inputs from a sensor of a vehicle. The processor may be configured to obtain the navigation information and the sensor inputs from the transceiver, and determine that a predetermined condition, of a plurality of predetermined conditions, may be met based on the sensor inputs. The processor may be further configured to determine a navigation notification based on the predetermined condition and the navigation information. Furthermore, the processor may be configured to output the determined navigation notification.

16 Claims, 5 Drawing Sheets

(56) References Cited

U.S. PATENT DOCUMENTS

| | | | |
|---|---|---|---|
| 2021/0374435 A1 | 12/2021 | Schwartz et al. | |
| 2022/0044556 A1* | 2/2022 | Luo | G08G 1/0145 |
| 2022/0068149 A1* | 3/2022 | Khatwa | G08G 5/56 |
| 2022/0383745 A1* | 12/2022 | Heilbron | G06V 20/582 |
| 2023/0392948 A1* | 12/2023 | Shanta | G01C 21/3691 |
| 2024/0326852 A1* | 10/2024 | Cho | B60W 30/18163 |

OTHER PUBLICATIONS

Rajesh Kannan Megalingam et al., Indian Traffic Sign Detection and Recognition Using Deep Learning, International Journal of Transportaton Science and Technology, Jun. 16, 2022.

* cited by examiner

ENHANCED NAVIGATION PROMPT SYSTEMS AND METHODS

FIELD

The present disclosure relates to a navigation systems and methods and more particularly to a navigation systems and methods for providing enhanced navigation prompts based on situational awareness.

BACKGROUND

Most modern vehicles are equipped with navigation systems that assist users when they drive their vehicles. For example, a navigation system may guide a user to drive on a best possible route in order to minimize travel time when the user travels from a source location to a destination location. Further, the navigation system may output turn-by-turn navigation instructions or prompts on the route, which may assist the user while driving to the destination location.

While turn-by-turn navigation instructions enhance user's driving experience, in many instances, the navigation instructions may not take into account a current vehicle situation or situation of the road where the vehicle may be located. Such navigation instructions may cause inconvenience to the user.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
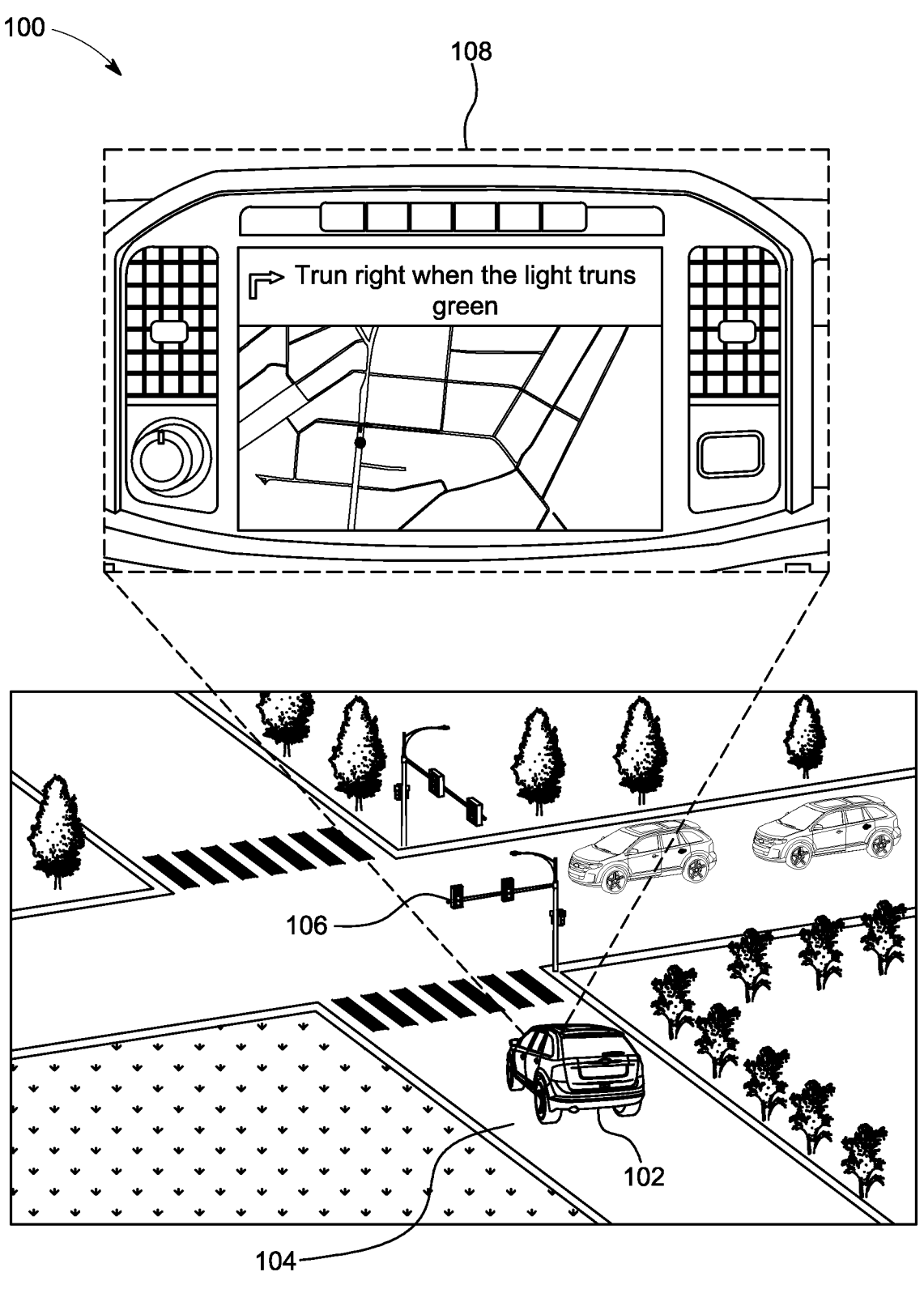
FIG. 1 depicts an environment in which techniques and structures for providing the systems and methods disclosed herein may be implemented.

The present disclosure describes a navigation system and method to provide enhanced navigation instructions or prompts to a vehicle user based on situational awareness of surroundings of a vehicle. The system may be configured to obtain inputs from vehicle sensors and other vehicles (via vehicle-to-vehicle (V2V) communication), and determine optimum navigation prompts based on the obtained inputs. In some aspects, the vehicle sensors may include external vehicle cameras, and the inputs obtained from the vehicle sensors may include images captured by the external vehicle cameras. Responsive to obtaining the images, the system may determine whether one or more predefined conditions may be met based on the obtained images and may determine customized navigation prompts based on the type of the predefined condition(s) that may be met.

For example, when the system determines that a traffic light may be red (based on the obtained images or via V2V communication) at a road intersection point from where the vehicle may be required to take a right turn, the system may determine a customized or "enhanced" navigation prompt stating, e.g., "Take right turn after the light turns green." Responsive to determining such enhanced navigation prompt, the system may cause a vehicle infotainment system or a user device to audibly and/or visually output the navigation prompt.

As another example, when the system determines that an obstruction (e.g., a construction zone) may be present in proximity to the turn that the vehicle may be required to take, the system may determine a customized navigation prompt stating, e.g., "Take right turn after clearing the construction zone." In this case as well, the system may cause the vehicle infotainment system or the user device to audibly and/or visually output the navigation prompt. In further aspects, the system may delay outputting the navigation prompt till the vehicle clears or crosses the construction zone.

In additional aspects, the system may be configured to obtain information associated with a geographical area where the vehicle may be travelling and may determine the enhanced navigation prompts based on the obtained information. In an exemplary aspect, the information may include names of one or more points of interest in the geographical area where the vehicle may be travelling. The system may use the names of the points of interest to provide enhanced navigation prompts. For example, the system may cause the vehicle infotainment system or the user device to output a navigation prompt, e.g., "Turn right after the museum" (as opposed to just outputting "Turn right," as provided by conventional navigation systems).

In further aspects, the system may be configured to obtain real-time vehicle information from the vehicle and may determine the enhanced navigation prompts based on the obtained vehicle information. In an exemplary aspect, the real-time vehicle information may include vehicle speed, vehicle rate of change of speed, and/or the like. The system may use the vehicle information to provide enhanced navigation prompts. For example, when the system determines that the vehicle may be slowing down (based on the vehicle information) in proximity to an incorrect turn, the system may output a navigation prompt stating, e.g., "Not this turn, turn on the next right turn." Similarly, when the system determines that the vehicle may not be slowing down or increasing speed in proximity to a turn that the vehicle may be expected to take, the system may output a navigation prompt stating, e.g., "Slow down, right turn is approaching."

The system may be further configured to determine faulty roadside conditions based on the images obtained from the vehicle exterior cameras and transmit a maintenance notification to authorities for repair. Examples of the faulty roadside conditions include, but are not limited to, non-functional traffic lights, graffiti that may be obstructing traffic signs, twisted/run-over/broken signs, signs obscured by foliage growth, and/or the like.

The present disclosure discloses a navigation system and method that provides enhanced navigation prompts based on situational awareness of vehicle's surroundings. Since the navigation prompts take into account real-time situation or context in proximity to the vehicle when the vehicle may be travelling, the navigation prompts are more relevant and useful for the user. Further, the navigation prompts provided by the system prevent the user from taking an incorrect turn while on a trip and/or missing a turn that the user should take to conveniently reach to the destination location. The system further assists the authorities in repairing faulty roadside conditions by transmitting timely maintenance notifications based on the images obtained from the vehicle cameras.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an environment 100 in which techniques and structures for providing the systems and methods disclosed herein may be implemented. The environment 100 may include a vehicle 102 that may be travelling on a road 104.

The vehicle 102 may take the form of any vehicle such as, for example, an off-road vehicle, a car, a crossover vehicle, a van, a minivan, a bus, a truck, etc. Further, the vehicle 102 may include any powertrain such as, for example, a gasoline engine, one or more electrically-actuated motor(s), a hybrid system, etc. Furthermore, the vehicle 102 may be a manually driven vehicle and/or may be configured to operate in a partially autonomous mode.

The vehicle 102 may include or may be communicatively coupled with a navigation system (shown as navigation system 200 in FIG. 2) that may provide navigation assistance to a vehicle user (e.g., a driver) when the user drives the vehicle 102. For example, the navigation system may provide turn-by-turn navigation instructions or "prompts" to the user via a vehicle infotainment system or a user device, when the user drives the vehicle 102 from a source location to a destination location.

In an exemplary aspect, the user may input the destination location (e.g., office address) on the vehicle infotainment system or the user device, when the user commences travel from the source location (e.g., home) to the destination location. The navigation system may obtain the destination location from the vehicle infotainment system or the user device and may determine the source location from a vehicle geolocation or Global Positioning System (GPS) receiver. Responsive to obtaining/determining the source and destination locations, the navigation system may determine a best possible route for the user to drive the vehicle 102 from the source location to the destination location. In some aspects, the best possible route may be a route with minimum travel time or a route with least traffic. The navigation system may utilize one or more known or conventional methods of determining the best possible route. Such known/conventional methods are not described in the present disclosure for the sake of simplicity and conciseness.

Responsive to determining the best possible route, the navigation system may provide turn-by-turn navigation prompts to the user (via the vehicle infotainment system or the user device), when the user drives the vehicle 102 from the source location to the destination location. In some aspects, the navigation system may be communicatively coupled with one or more vehicle sensors (shown as sensors 210 in FIG. 2), a vehicle control unit (shown as vehicle control unit 208 in FIG. 2), one or more servers (shown as servers 204 in FIG. 2), and/or other vehicles via vehicle-to-vehicle (V2V) communication that may provide inputs to the navigation system at a predefined frequency. The navigation system may be configured to provide "enhanced" navigation prompts to the user based on the inputs received from the units described above.

For example, when the vehicle 102 may be approaching an intersection point at which the vehicle 102 may have to turn right (or left) and the navigation system detects that a traffic light/signal 106 at the intersection point may be red based on the inputs provided by the vehicle sensors (e.g., exterior vehicle cameras), the navigation system may provide a navigation prompt stating, "Turn right when the light turns green," as shown in view 108 of FIG. 1. In a conventional navigation system, a navigation prompt in a similar vehicle situation (i.e., when the traffic signal 106 may be red) may be "Turn right". However, a person ordinarily skilled in the art may appreciate that such a navigation prompt may not be accurate, as the user may not turn right till the traffic light 106 changes from red to green. Therefore, conventional navigation systems do not take into account a current vehicle situation while providing navigation prompts. The navigation system, as disclosed in the present disclosure, utilizes inputs from the units described above to provide enhanced navigation prompts based on situational awareness of vehicle's surroundings, thus enhancing user convenience.

As another example, when the navigation system detects that the vehicle 102 may be slowing down (based on inputs obtained from the vehicle control unit) and about to take an incorrect turn while on the route to the destination location, the navigation system may provide a prompt stating, "Not this turn, take the next right turn". In this manner, the navigation system may prevent the user from going off the route by tracking vehicle's speed or rate of change of speed to predict if the user/vehicle 102 may be about to take an incorrect turn.

Details of the navigation system are described below in conjunction with FIG. 2.

The vehicle 102, the user, and the navigation system implement and/or perform operations, as described here in the present disclosure, in accordance with the owner manual and safety guidelines. In addition, any action taken by a user of the vehicle in response to one or more navigation prompts disclosed herein should comply with all rules and regulations specific to the location and operation of the vehicle (e.g., Federal, state, country, city, etc.). More so, any navigation prompts disclosed herein are for illustrative purposes only. Certain navigation prompts may be modified and/or omitted depending on the context, situation, and applicable rules and regulations. Further, regardless of the navigation prompts, users should use good judgement and common sense when operating the vehicle. That is, all navigation prompts, whether standard or "enhanced," should be treated as suggestions and only followed when safe to do so and when in compliance with any rules and regulations specific to the location and operation of the vehicle.

Figure 2:
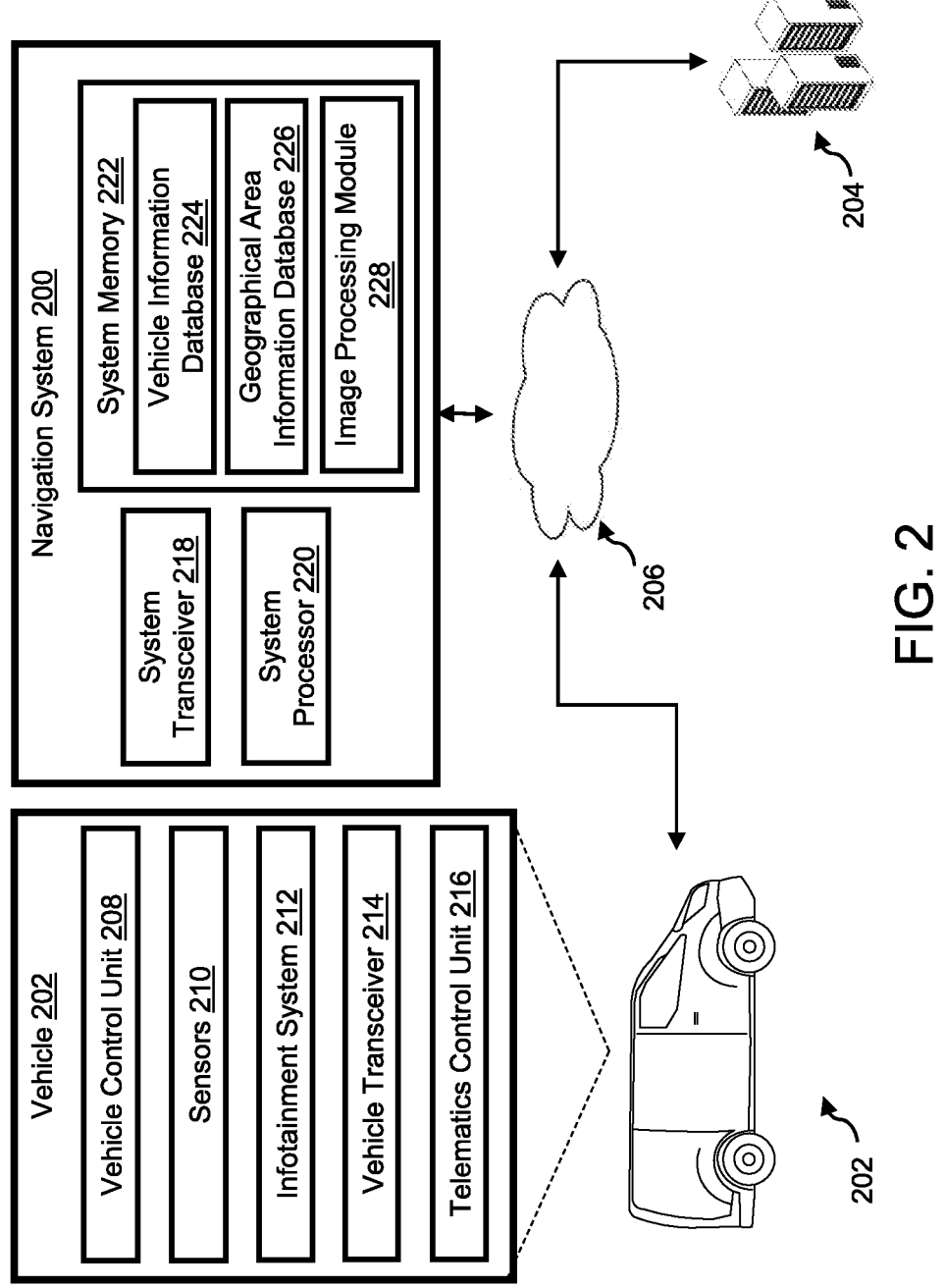
FIG. 2 depicts a navigation system in accordance with the present disclosure.

FIG. 2 depicts an example navigation system 200 in accordance with the present disclosure. The navigation system 200, as described herein, can be implemented in hardware, software (e.g., firmware), or a combination thereof. While describing FIG. 2, references may be made to FIGS. 3 and 4.

The navigation system 200 (or system 200) may be communicatively coupled with a vehicle 202 and one or more servers 204, via a network 206. The vehicle 202 may be same as the vehicle 102 described above in conjunction with FIG. 1. Although FIG. 2 depicts the system 200 as being separate from the vehicle 202, in some aspects, the system 200 may be part of the vehicle 202.

The server(s) 204 may be one or more navigation or commercial servers associated with map providers that provide navigation information or map information associated with a geographical area where the vehicle 202 may be located to the system 200. In some aspects, the map information may include a digital map of the geographical area where the vehicle 202 may be located, names of a plurality of points of interest (e.g., restaurants, office building, parks, etc.) in the geographical area, and/or the like.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE®, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units that may be communicatively coupled with each other. The plurality of units included in the vehicle 202 includes, but is not limited to, a vehicle control unit 208 (or VCU 208), one or more sensors 210, an infotainment system 212, a vehicle transceiver 214, and a telematics control unit 216 (or TCU 216). The VCU 208 may be configured to determine vehicle information including, but not limited to, vehicle speed, vehicle rate of change of speed, vehicle heading, and/or the like. The VCU 208 may transmit the vehicle information to the vehicle transceiver 214 and/or to a vehicle memory (not shown) for storage purpose.

The sensors 210 may include, but are not limited to, vehicle interior and exterior cameras, Radio Detection and Ranging (RADAR or "radar") sensors, Light Detecting and Ranging (LiDAR or "lidar") sensors, and/or the like. The sensors 210 may be configured to capture images in proximity to the vehicle 202 and/or detect and localize objects inside and outside the vehicle 202, and transmit sensor inputs to the vehicle transceiver 214 and/or to the vehicle memory for storage purpose.

The infotainment system 212 may be configured to receive inputs from a vehicle user and output notifications, instructions, and/or the like. For example, the user may input details (e.g., name, address, etc.) of a destination location where the user may desire to reach on the infotainment system 212. Further, the infotainment system 212 may be configured to output audible and/or visual navigation prompts that may assist the user to drive from the source location to the destination location.

The TCU 216 may be configured determine a vehicle geolocation by using Global Position System (GPS) signals. Specifically, the TCU 216 may include a GPS receiver that may receive GPS signals. The TCU 216 may determine a real-time vehicle geolocation based on the received GPS signals and may transmit the determined vehicle geolocation to the vehicle transceiver 214 and/or to the vehicle memory for storage purpose.

The vehicle transceiver 214 may be configured to receive and transmit data, information, instructions, etc. from/to units inside the vehicle 202 and from/to systems or devices external to the vehicle 202 via the network 206. For example, the vehicle transceiver 214 may be configured to transmit sensor inputs (obtained from the sensors 210), the vehicle information (obtained from the VCU 208), the vehicle geolocation (obtained from the TCU 216), user inputs (obtained from the infotainment system 212), and/or the like, to the system 200 and other external devices (e.g., a user device, not shown) via the network 206. Similarly, the vehicle transceiver 214 may be configured to receive data, information, instructions (e.g., turn-by-turn navigation instructions/prompts), etc. from the system 200 and other external devices via the network 206.

A person ordinarily skilled in the art may appreciate that the vehicle architecture shown in FIG. 2 may omit certain vehicle units and/or vehicle computing modules. It should be readily understood that the vehicle 202 depicted in FIG. 2 is an example of a possible implementation according to the present disclosure, and thus, it should not be considered limiting or exclusive.

The system 200 may include a plurality of units that may be communicatively coupled with each other. The plurality of units included in the system 200 includes, but is not limited to, a system transceiver 218, a system processor 220 and a system memory 222. The system transceiver 218 may be configured to receive and transmit data, information, instructions, etc. from/to units inside the system 200 and from/to systems (e.g., the vehicle 202, the server(s) 204) or devices external to the system 200 via the network 206.

The system processor 220 may be disposed in communication with one or more memory devices (e.g., the system memory 222 and/or one or more external databases not shown in FIG. 2). The system processor 220 may utilize the system memory 222 to store programs in code and/or to store data for performing various system operations in accordance with the present disclosure. The system memory 222 may be a non-transitory computer-readable storage memory. The system memory 222 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In some aspects, the system memory 222 may include a plurality of modules and databases including, but not limited to, a vehicle information database 224, a geographical area information database 226 and an image processing module 228. The image processing module 228, as described herein, may be stored in the form of computer-executable instructions, and the system processor 220 may be configured and/or programmed to execute the stored computer-executable instructions for providing navigation instructions/prompts in accordance with the present disclosure. The functions of the databases included in the system memory 222 are described in the description below.

In operation, the user may input details of the destination location (e.g., office address) on the infotainment system 212 or a user device (not shown). The infotainment system 212 or the user device may transmit the destination location details to the vehicle transceiver 214. The vehicle transceiver 214 may further obtain a current real-time vehicle geolocation (e.g., a source location). Responsive to obtaining the source location and destination location details, the vehicle transceiver 214 may transmit these location details to the system transceiver 218 via the network 206.

The system transceiver 218 may receive the source and destination location details of the vehicle trip from the vehicle transceiver 214 and may send the received details to the system processor 220 and to the vehicle information database 224 for storage purpose. Responsive to obtaining the source and destination location details, the system processor 220 may fetch (or send a request to receive) navigation information associated with the destination location from the server(s) 204 via the network 206. Specifically, the system processor 220 may fetch, via the system transceiver 218 and the network 206, navigation information associated with a geographical area including the source location and the destination location from the server(s) 204. In some aspects, the navigation information may include map information associated with a geographical area where the vehicle 202 may be located or a geographical area including the source location and the destination location. In further aspects, the navigation information may include names of a plurality of points of interest (e.g., restaurants, office buildings, parks, etc.) in the geographical area where the vehicle 202 may be located or the geographical area including the source location and the destination location. In alternative aspects, the names of the plurality of points of interest may be obtained as "additional" information from the server(s) 204 and/or a cloud storage and not as part of the navigation information. In some aspects, the system processor 220 may send the obtained navigation information (and/or the additional information) to the geographical area information database 226 for storage purpose.

Responsive to obtaining the navigation information from the server(s) 204 via the system transceiver 218, the system processor 220 may determine a best possible route that the vehicle 102 may traverse from the source location to the destination location, as described above in conjunction with FIG. 1. Responsive to determining the best possible route, the system processor 220 may transmit, via the system transceiver 218, details of the best possible route to the vehicle transceiver 214. The vehicle transceiver 214 may send the received details of the best possible route to the infotainment system 212, and the infotainment system 212 may display the received details on an infotainment system display screen. The user may then view the details on the display screen and may commence the vehicle trip.

In some aspects, the system transceiver 218 may receive sensor inputs from the sensors 210, the real-time vehicle geolocation from the TCU 216, the vehicle information from the VCU 208 via the vehicle transceiver 214 at a predefined frequency, and/or inputs from other vehicles via V2V communication, when the vehicle 202 may be traversing the vehicle trip. Responsive to receiving the inputs/information described above, the system transceiver 218 may send the inputs/information to the system processor 220.

The system processor 220 may obtain the inputs/information described above from the system transceiver 218 and may determine turn-by-turn navigation instructions or prompts based on the obtained inputs/information and the navigation information obtained from the server(s) 204. Specifically, the system processor 220 may be configured to determine "enhanced" turn-by-turn navigation prompts based on the obtained inputs and the navigation information, when a predetermined condition, of a plurality of predetermined conditions, may be met. In some aspects, the plurality of predetermined conditions may be, for example, presence of a stop sign on a side of the road 104 where the vehicle 202 may be travelling, presence of a traffic signal, presence of an obstruction on the road 104, presence of traffic on the road 104, and/or the like. The process of determining the enhanced turn-by-turn navigation prompts when a predetermined condition is met may be understood in conjunction with the description provided below.

In some aspects, the system processor 220 may determine a turn (left or right) on the road 104 that the vehicle 202 may have to take while on the vehicle trip based on the navigation information (e.g., the map information) and the real-time vehicle geolocation obtained from the TCU 216. Responsive to determining the turn, the system processor 220 may determine whether a predetermined condition may be met based on the sensor inputs obtained from the sensors 210 and/or the vehicle information obtained from the VCU 208. In some aspects, the system processor 220 may determine that the predetermined condition may be met by executing instructions stored in the image processing module 228.

Specifically, responsive to obtaining images (i.e., the sensor inputs) of vehicle's surroundings captured by the vehicle exterior cameras (i.e., the sensors 210), the system processor 220 may execute instructions stored in the image processing module 228 to determine whether a stop sign may be disposed in proximity to the turn on the road 104 (as a "first predefined condition"), the traffic light 106 may be red (as a "second predefined condition"), an obstruction (e.g., a construction zone, a broken vehicle, etc.) may be present in proximity to the turn on the road 104 (as a "third predefined condition"), traffic may be present proximity to the turn on the road 104 (as a "fourth predefined condition"), and/or the like. The examples of predefined conditions described herein are for illustrative purpose and should not be construed as limiting.

Based on a type of predefined condition that may be met, the system processor 220 may determine an appropriate navigation prompt when the vehicle 202 may be required to take the turn (as determined by using the navigation information and the real-time vehicle geolocation). In some aspects, the system memory 222 may pre-store a mapping of a plurality of navigation prompts with the plurality of predefined conditions, and the system processor 220 may fetch the mapping from the system memory 222 to determine the navigation prompt based on the type of the predefined condition that may be met. In other aspects, the system processor 220 may be an Artificial Intelligence (AI)/Machine Learning (ML) based processor that may "learn" from historical navigation prompts, inputs received from other vehicles or navigation systems installed in other vehicles, feedback received from users, and/or the like, to itself create navigation prompts based on situational awareness. The system processor 220 may enhance or refine navigation prompts with time, as the system processor 220 learns from the information described above.

For example, the system processor 220 may use the mapping obtained from the system memory 222 to determine a navigation prompt stating, "Turn right when the light turns green," when the system processor 220 determines that the traffic light 106 may be red. Responsive to determining the navigation prompt, the system processor 220 may output or transmit, via the system transceiver 218, the navigation prompt to the vehicle transceiver 214 (or the user device). Responsive to obtaining the navigation prompt from the system transceiver 218, the vehicle transceiver 214 may send the navigation prompt to the infotainment system 212, which may audibly and/or visually output the navigation prompt, as shown in the view 108 of FIG. 1. In this manner, the system processor 220 uses inputs from the sensors 210 (e.g., vehicle exterior cameras) of the vehicle 202 to provide enhanced navigation prompts taking into account a vehicle's current situation or context. Thus, the navigation prompts provided by the system processor 220 are based on situational awareness of vehicle's surroundings and are therefore more relevant to the user.

As another example, the system processor 220 may determine a prompt stating, "Follow the red vehicle in front of you," when the system processor 220 determines that the vehicle in front of the vehicle 202 may be travelling to a similar destination location or may be traversing a same path or taking same turn(s).

Figure 3:
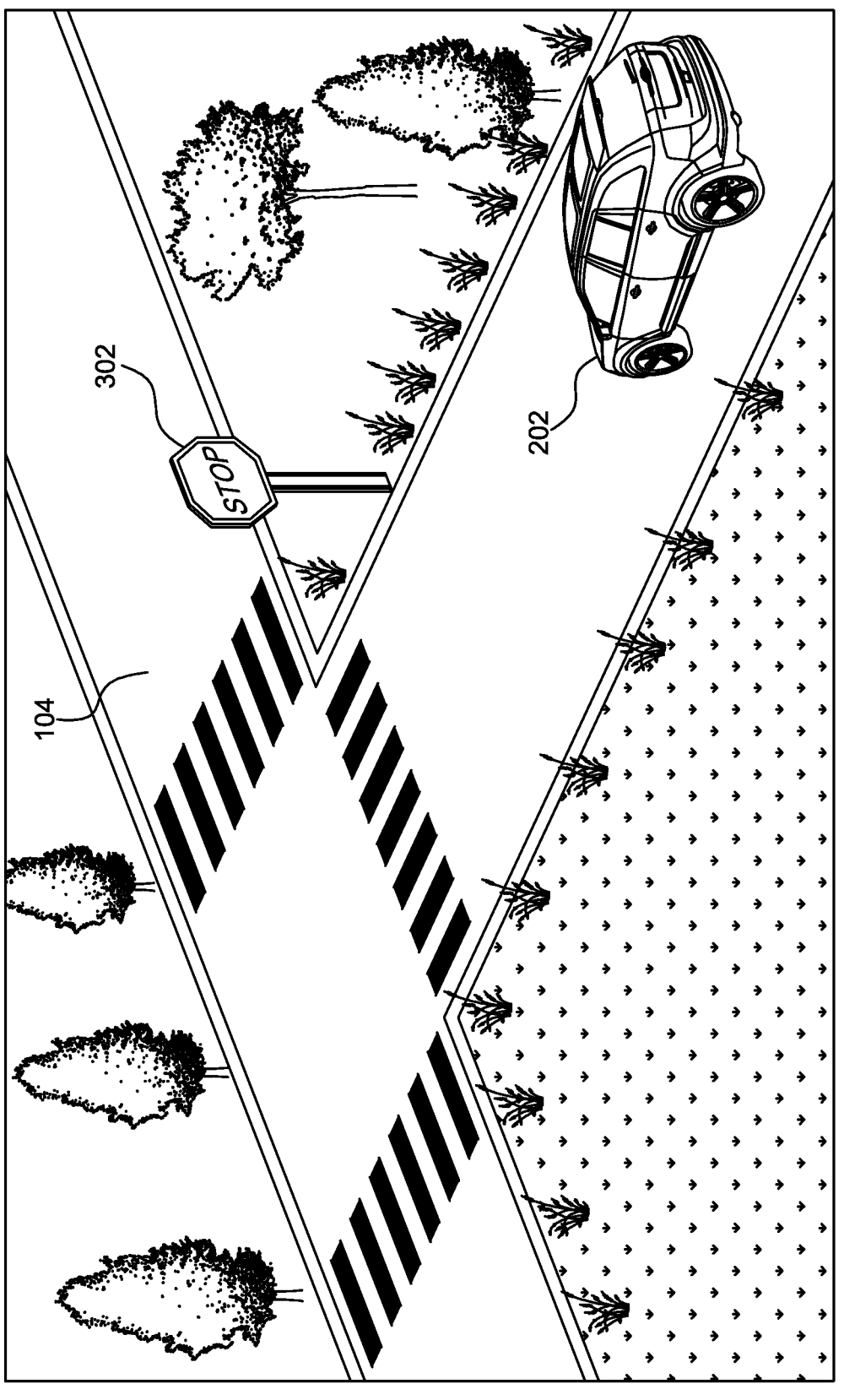
FIG. 3 depicts a first scenario of a vehicle travelling on a road in accordance with the present disclosure.
Figure 4:
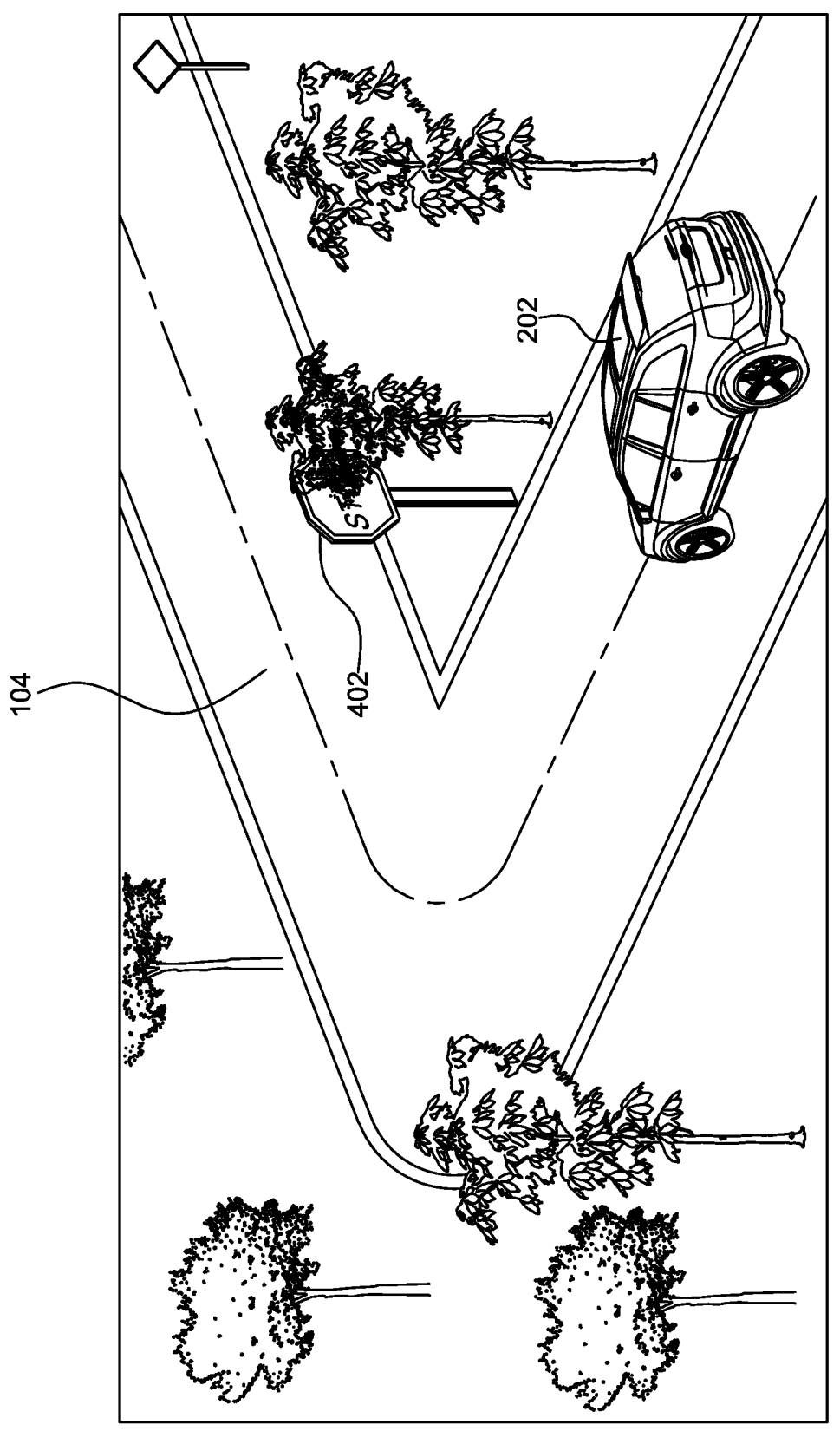
FIG. 4 depicts a second scenario of a vehicle travelling on a road in accordance with the present disclosure.

As another example, in some aspects, the system processor 220 may use the mapping obtained from the system memory 222 to determine a navigation prompt stating, "Go Slow and Turn right after the Stop Sign," when the system processor 220 determines that a stop sign 302 (as shown in FIG. 3) may be present in proximity to the turn that the vehicle 202 may be required to take on the vehicle trip. In this case as well, the system processor 220 may cause the infotainment system 212 to audibly and/or visually output the determined navigation prompt, as described above. In alternative aspects, the system processor 220 may delay outputting the navigation prompt till the vehicle 202 crosses the stop sign 302, when the system processor 220 detects the stop sign 302 in proximity to the turn or on the road 104.

As yet another example, in some aspects, the system processor 220 may use the mapping obtained from the system memory 222 to determine a navigation prompt stating, "Turn right after the traffic clears" or "Turn right after the construction zone," when the system processor 220 determines that traffic or a construction zone may be present in proximity to the turn that the vehicle 202 may be required to take on the vehicle trip. In this case as well, in alternative aspects, the system processor 220 may delay outputting the navigation prompt till the traffic clears or the vehicle 202 crosses the construction zone.

In further aspects, the system processor 220 may use the names of the plurality of points of interest (e.g., restaurants, office buildings, parks, etc., obtained as part of navigation or additional information from the server(s) 204) on the road 104 in proximity to the turn to determine the enhanced navigation prompts. For example, instead of outputting a navigation prompt, "Turn Right," the system processor 220 may determine a navigation prompt stating "Turn Right after the Restaurant," based on the obtained navigation and/or additional information and the real-time vehicle geolocation. In this manner, the system processor 220 determines a navigation prompt that may be contextually more relevant to a situation or location where the vehicle 202 may be present and may thus assist the user to conveniently use the navigation prompt. In this case as well, the system processor 220 may cause the infotainment system 212 to audibly and/or visually output the determined navigation prompt (i.e., "Turn Right after the Restaurant"), as described above.

In additional aspects, the system processor 220 may determine navigation prompts based on the vehicle information obtained from the VCU 208 and the real-time vehicle geolocation. For example, when the system processor 220 determines that the vehicle 202 may be slowing down (based on rate of change of vehicle speed information obtained from the VCU 208) in proximity to an incorrect turn on the road 104, the system processor 220 may determine that the vehicle 202 may be about to take the incorrect turn. Responsive to such determination, the system processor 220 may determine and output a navigation prompt, "Not this turn, take the next right turn" or "This is an incorrect turn". The system processor 220 may cause the infotainment system 212 to output such a notification, which may prevent the user from taking an incorrect turn.

In a similar manner, when the system processor 220 determines that the vehicle 202 may not be slowing down or increasing vehicle speed in proximity to a turn that the vehicle 202 should take on the vehicle trip, the system processor 220 may determine that the vehicle 202 may be about to miss the turn. Responsive to such determination, the system processor 220 may determine and output a navigation prompt, "Slow down, you need to take the next right turn". The system processor 220 may cause the infotainment system 212 to output such a navigation prompt, which may prevent the user from missing the turn.

Although the description above describes aspects where the system processor 220 causes the infotainment system 212 to output navigation prompts, in some aspects, the system processor 220 may alternatively or additionally transmit, via the system transceiver 218 and the network 206, the navigation prompts to a user device or other navigation devices. In this manner, the user device and/or other navigation devices too may use and output the enhanced navigation prompts.

Furthermore, although the description above describes aspects where the system processor 220 uses the sensor inputs obtained from the sensors 210 and/or the vehicle information obtained from the VCU 208 to determine appropriate navigation prompts, in some aspects, the system processor 220 may use sensor inputs for performing additional actions. In an exemplary aspect, when the system processor 220 detects presence of a stop sign, a construction zone, a broken vehicle or any other obstruction on the road 104 by using the images captured by the vehicle cameras (i.e., the sensors 210), the system processor 220 may transmit information about such detection to external servers (e.g., commercial navigation servers or firms), cloud storage, other vehicles, and/or the like, for storage purpose and for enhanced navigation purpose. For example, a commercial navigation server receiving such information may update its database to include indication of a construction zone or a stop sign on the road 104, so that the navigation server may provide accurate or "enhanced" navigation services or instructions to its customers.

In another exemplary aspect, when the system processor 220 detects a faulty roadside condition based on the images captured by the vehicle cameras, the system processor 220 may transmit, via the system transceiver 218, a maintenance notification to a maintenance server (not shown). In some aspects, the maintenance server may be associated with authorities (e.g., municipalities), and the maintenance notification may include information associated with the faulty roadside condition (e.g., geolocation of the faulty roadside condition, images captured by the vehicle cameras, and/or the like). Examples of faulty roadside conditions may include, but are not limited to, non-functional traffic lights, graffiti that may be obstructing traffic signs, twisted/runover/broken signs, signs obscured by foliage growth (shown as sign 402 in FIG. 4), etc.

Responsive to receiving the maintenance notification, the relevant authorities may repair the faulty roadside condition. In this manner, the system processor 220 assists in enhancing overall driving experience of the user, in addition to providing enhanced navigation prompts described above.

Figure 5:
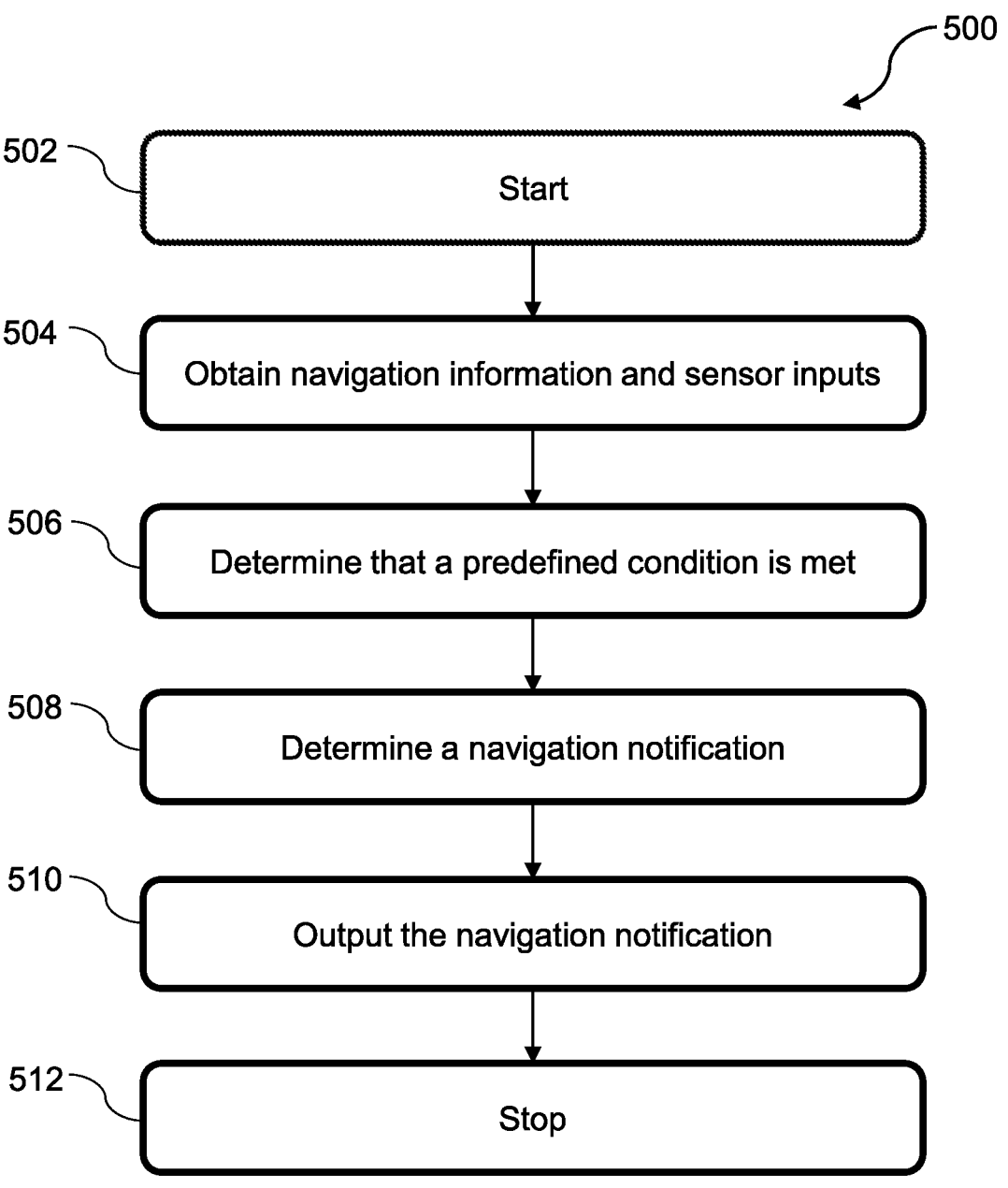
FIG. 5 depicts a flow diagram of a navigation method in accordance with the present disclosure.

FIG. 5 depicts a flow diagram of an example navigation method 500 in accordance with the present disclosure. FIG. 5 may be described with continued reference to prior figures FIGS. 1-4. The following process is exemplary and not confined to the steps described hereafter. Moreover, alternative embodiments may include more or less steps than are shown or described herein and may include these steps in a different order than the order described in the following example embodiments.

Referring to FIG. 5, at step 502, the method 500 may commence. At step 504, the method 500 may include obtaining, by the system processor 220, the navigation information and the sensor inputs. At step 506, the method 500 may include determining, by the system processor 220, that a predefined condition may be met based on the sensor inputs. For example, as described above, the system processor 220 may determine whether a stop sign, a traffic light/signal or an obstruction may be present in proximity to a turn that the vehicle 202 may take on the road 104.

Responsive to determining that a predefined condition may be met, at step 508, the system processor 220 may determine an optimum navigation instruction or prompt based on a type of the predefined condition that may be met, the navigation information and the real-time vehicle geolocation, as described above. At step 510, the method 500 may include outputting or transmitting, by the system processor 220 via the system transceiver 218, the determined navigation prompt to the vehicle transceiver 214, so that the infotainment system 212 may audibly and/or visually output the navigation prompt.

At step 512, the method 500 ends.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A navigation system comprising:
a transceiver configured to receive navigation information from a navigation server and sensor inputs from a sensor of a vehicle, the sensor comprising a vehicle camera; and
a processor communicatively coupled with the transceiver, wherein the processor is configured to:
obtain the navigation information and the sensor inputs from the transceiver, the sensor inputs comprising images of surroundings of the vehicle captured by the vehicle camera;
receive vehicle information from a vehicle control unit, the vehicle information comprising a vehicle speed, a vehicle heading, and a vehicle rate of change of speed;
determine that a predetermined condition associated with surroundings of the vehicle, of a plurality of predetermined conditions associated with surroundings of the vehicle, is met based on the images;

determine, based on the vehicle information, that the vehicle is slowing down to initiate a turn at a first location;

determine a navigation notification based on the predetermined condition, the determination that the vehicle is slowing down to initiate the turn at the first location, and the navigation information, wherein the navigation notification indicates that the vehicle should initiate a turn at a second location instead of the first location; and output the navigation notification to a vehicle infotainment system of the vehicle, wherein the vehicle infotainment system audibly or visually outputs the navigation notification to a driver of the vehicle to prevent the driver from initiating the turn at the first location.

2. The navigation system of claim 1, wherein the transceiver is further configured to receive a destination location of a vehicle trip, and wherein the navigation information is associated with the destination location.

3. The navigation system of claim 1, wherein the navigation information comprises map information associated with a geographical area where the vehicle is located.

4. The navigation system of claim 1, wherein the images comprise at least one of a stop sign, a traffic signal, an obstruction, or traffic along a route of the vehicle.

5. The navigation system of claim 1, wherein the plurality of predetermined conditions comprises a presence of a stop sign, a presence of a traffic signal, a presence of an obstruction, and a presence of traffic.

6. The navigation system of claim 1, wherein the transceiver is further configured to receive additional information associated with a geographical area where the vehicle is located from an external server, and wherein the processor is further configured to:

obtain the additional information from the transceiver; and determine the navigation notification based on the additional information.

7. The navigation system of claim 6, wherein the additional information comprises names of one or more points of interest in the geographical area where the vehicle is located.

8. The navigation system of claim 1, wherein the processor is further configured to:

determine a faulty roadside condition based on the sensor inputs; and transmit a maintenance notification to a maintenance server responsive to determining the faulty roadside condition, wherein the maintenance notification comprises information associated with the faulty roadside condition.

9. A navigation method comprising:

obtaining, by a processor, navigation information from a navigation server and sensor inputs from a sensor of a vehicle, the sensor comprising a vehicle camera, and the sensor inputs comprising images of surroundings of the vehicle captured by the vehicle camera;

receiving, by the processor, vehicle information from a vehicle control unit, the vehicle information comprising a vehicle speed, a vehicle heading, and a vehicle rate of change of speed;

determining, by the processor, that a predetermined condition associated with surroundings of the vehicle, of a plurality of predetermined conditions associated with surroundings of the vehicle, is met based on the images;

determining, by the processor and based on the vehicle information, that the vehicle is slowing down to initiate a turn at a first location;

determining, by the processor, a navigation notification based on the predetermined condition, the determination that the vehicle is slowing down to initiate the turn at the first location, and the navigation information, wherein the navigation notification indicates that the vehicle should initiate a turn at a second location instead of the first location; and outputting, by the processor, the navigation notification to a vehicle infotainment system of the vehicle, wherein the vehicle infotainment system audibly or visually outputs the navigation notification to a driver of the vehicle to prevent the driver from initiating the turn at the first location.

10. The navigation method of claim 9, wherein the navigation information comprises map information associated with a geographical area where the vehicle is located.

11. The navigation method of claim 9, wherein the images comprise at least one of a stop sign, a traffic signal, an obstruction, or traffic along a route of the vehicle.

12. The navigation method of claim 9, wherein the plurality of predetermined conditions comprises a presence of a stop sign, a presence of a traffic signal, a presence of an obstruction, and a presence of traffic.

13. The navigation method of claim 9 further comprising:

obtaining additional information associated with a geographical area where the vehicle is located from an external server; and determining the navigation notification based on the additional information.

14. The navigation method of claim 13, wherein the additional information comprises names of one or more points of interest in the geographical area where the vehicle is located.

15. The navigation method of claim 9 further comprising:

determining a faulty roadside condition based on the sensor inputs; and transmitting a maintenance notification to a maintenance server responsive to determining the faulty roadside condition, wherein the maintenance notification comprises information associated with the faulty roadside condition.

16. A non-transitory computer-readable storage medium having instructions stored thereupon which, when executed by a processor, cause the processor to:

obtain navigation information from a navigation server and sensor inputs from a sensor of a vehicle, the sensor comprising a vehicle camera, and the sensor inputs comprising images of surroundings of the vehicle captured by the vehicle camera;

receive vehicle information from a vehicle control unit, the vehicle information comprising a vehicle speed, a vehicle heading, and a vehicle rate of change of speed;

determine that a predetermined condition associated with surroundings of the vehicle, of a plurality of predetermined conditions associated with surroundings of the vehicle, is met based on the images;

determine, based on the vehicle information, that the vehicle is slowing down to initiate a turn at a first location;

determine a navigation notification based on the predetermined condition, the determination that the vehicle is slowing down to initiate the turn at the first location, and the navigation information, wherein the navigation notification indicates that the vehicle should initiate a turn at a second location instead of the first location; and output the navigation notification to a vehicle infotainment system of the vehicle, wherein the vehicle infotainment system audibly or visually outputs the navigation notification to a driver of the vehicle to prevent the driver from initiating the turn at the first location.

\* \* \* \* \*